United States Patent
Liu et al.

(10) Patent No.: US 11,207,982 B2
(45) Date of Patent: Dec. 28, 2021

(54) ELECTRONIC POWER MODULE ASSEMBLIES AND CONTROL LOGIC WITH DIRECT-COOLING HEAT PIPE SYSTEMS

(71) Applicant: GM GLOBAL TECHNOLOGY OPERATIONS LLC, Detroit, MI (US)

(72) Inventors: Ming Liu, Shanghai (CN); Anthony M. Coppola, Rochester Hills, MI (US); Kestutis A. Sonta, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 224 days.

(21) Appl. No.: 16/710,772

(22) Filed: Dec. 11, 2019

(65) Prior Publication Data
US 2021/0178902 A1    Jun. 17, 2021

(51) Int. Cl.
*B60L 15/20*    (2006.01)
*B60L 1/02*    (2006.01)
(Continued)

(52) U.S. Cl.
CPC .............. *B60L 1/02* (2013.01); *B60L 15/20* (2013.01); *B60L 50/64* (2019.02); *B60L 53/22* (2019.02);
(Continued)

(58) Field of Classification Search
CPC ............. H01M 10/625; H01M 10/513; H01M 10/6556; H01M 10/6552; B60L 50/64; B60L 1/02; B60L 15/20; B60K 1/02
See application file for complete search history.

(56) References Cited

U.S. PATENT DOCUMENTS 2,020,094 A * 11/1935 Bayley ................. E06B 9/01
                                                   52/204.51
6,103,075 A    8/2000 Winsel et al.
(Continued)

OTHER PUBLICATIONS

Yasuyuki Sakai, Hiroshi Ishiyama, Takaji Kikuchi; Power Control Unit for High Power Hybrid System; SAE Technical Paper Series; 2007-01-0271; Apr. 16-19, 2007.
(Continued)

*Primary Examiner* — James A Shriver, II
*Assistant Examiner* — James J Triggs
(74) *Attorney, Agent, or Firm* — Quinn IP Law (57) ABSTRACT

Presented are electronic power module assemblies with direct-cooling heat pipe systems, methods for making/using such power module assemblies, and vehicles equipped with such power module assemblies. A power module assembly includes an outer housing with an internal coolant chamber that circulates therethrough a coolant fluid. A sidewall of the module's housing defines therethrough multiple coolant windows that fluidly connect to the coolant chamber. A power semiconductor switching device is mounted to the module housing, fluidly sealed to a first coolant window with the power device's inboard surface exposed to the coolant fluid. The power device is operable to modify electric current transmitted between a power source and an electrical load. A heat pipe with an outer casing has a first casing segment thereof mounted to an outboard surface of the power device, and a second casing segment fluidly sealed to a second coolant window and exposed to the coolant fluid.

20 Claims, 4 Drawing Sheets

(51) Int. Cl.
  *B60L 50/64* (2019.01)
  *B60L 53/22* (2019.01)
  *H01M 10/6556* (2014.01)
  *H01M 10/6552* (2014.01)
  *H01M 10/613* (2014.01)
  *H01M 10/625* (2014.01)
  *B60L 53/12* (2019.01)

(52) U.S. Cl.
  CPC ....... *H01M 10/613* (2015.04); *H01M 10/625* (2015.04); *H01M 10/6552* (2015.04); *H01M 10/6556* (2015.04); *B60L 53/12* (2019.02); *H01M 2220/20* (2013.01)

(56) References Cited

U.S. PATENT DOCUMENTS

| | | | |
|---|---|---|---|
| 6,639,385 | B2 | 10/2003 | Verbrugge et al. |
| 6,641,942 | B1 | 11/2003 | Rouillard et al. |
| 7,109,685 | B2 | 9/2006 | Tate, Jr. et al. |
| 7,324,902 | B2 | 1/2008 | Verbrugge et al. |
| 7,373,264 | B2 * | 5/2008 | Verbrugge ............ G01R 31/367 702/64 |
| 7,612,532 | B2 * | 11/2009 | Verbrugge ............ H01M 10/48 320/132 |
| 7,768,233 | B2 | 8/2010 | Lin et al. |
| 7,928,690 | B2 | 4/2011 | Koch et al. |
| 8,035,986 | B2 | 10/2011 | Koetting et al. |
| 8,054,046 | B2 * | 11/2011 | Lin ...................... H01M 10/482 320/156 |
| 8,059,404 | B2 | 11/2011 | Miller et al. |
| 8,108,160 | B2 | 1/2012 | Liu et al. |
| 8,170,818 | B2 | 5/2012 | Lin et al. |
| 8,198,864 | B2 | 6/2012 | Koch et al. |
| 8,212,519 | B2 | 7/2012 | Koch et al. |
| 8,321,164 | B2 | 11/2012 | Liu et al. |
| 8,581,543 | B2 | 11/2013 | Koch et al. |
| 8,645,088 | B2 * | 2/2014 | Schaefer ............ G01R 31/3842 702/63 |
| 8,836,280 | B2 | 9/2014 | Koch et al. |
| 9,172,118 | B2 | 10/2015 | Marsh et al. |
| 9,176,194 | B2 | 11/2015 | Meisner et al. |
| 9,178,192 | B2 | 11/2015 | Payne |
| 9,337,484 | B2 | 5/2016 | Verbrugge et al. |
| 9,354,277 | B2 | 5/2016 | Lin et al. |
| 9,461,490 | B2 | 10/2016 | Ying |
| 9,513,338 | B2 | 12/2016 | Koch et al. |
| 9,669,835 | B2 * | 6/2017 | Kim ................... B60W 10/026 |
| 9,790,867 | B2 * | 10/2017 | Carlson ............ F02M 35/10229 |
| 10,040,448 | B2 * | 8/2018 | Dudar .................... F02D 15/00 |
| 10,167,799 | B2 * | 1/2019 | Serrano ................. F01N 11/007 |
| 10,408,140 | B2 * | 9/2019 | Yuan ......................... F01N 9/00 |
| 2011/0309838 | A1 | 12/2011 | Lin et al. |
| 2014/0297084 | A1 | 10/2014 | Meisner et al. |
| 2015/0017508 | A1 | 1/2015 | Khakhalev |
| 2015/0162571 | A1 | 6/2015 | Ogg et al. |
| 2015/0166037 | A1 * | 6/2015 | Bergkoetter ............ F02D 13/06 477/181 |
| 2015/0301116 | A1 | 10/2015 | Baker et al. |
| 2015/0318502 | A1 | 11/2015 | Kanai |
| 2016/0039419 | A1 | 2/2016 | Wampler et al. |
| 2016/0077160 | A1 | 3/2016 | Wampler, II et al. |
| 2016/0254562 | A1 | 9/2016 | Morris-Cohen et al. |
| 2016/0259011 | A1 | 9/2016 | Joe |
| 2016/0293991 | A1 | 10/2016 | Goeltz et al. |
| 2016/0336552 | A1 | 11/2016 | MacLean et al. |
| 2016/0372777 | A1 | 12/2016 | Buckley et al. |
| 2017/0077507 | A1 | 3/2017 | Harada et al. |
| 2018/0375132 | A1 | 12/2018 | Li et al. |
| 2019/0126770 | A1 | 5/2019 | Koch et al. |
| 2019/0157710 | A1 | 5/2019 | Makino et al. |
| 2019/0357386 | A1 | 11/2019 | Coppola et al. |

OTHER PUBLICATIONS

Amanullah Khan, Timothy Grewe, Jinming Liu, Mohammad Anwar, Alan Holmes, Richard Balsley; The GM RWD PHEV Propulsion System for the Cadillac CT6 Luxury Sedan; SAE Technical Paper Series; 2016-01-1159; Published Apr. 5, 2016.

* cited by examiner

ELECTRONIC POWER MODULE ASSEMBLIES AND CONTROL LOGIC WITH DIRECT-COOLING HEAT PIPE SYSTEMS

The present disclosure relates generally to high-voltage electrical power systems. More specifically, aspects of this disclosure relate to thermal management systems for traction power inverter modules (TPIM) of electrified vehicle powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric ("electric-drive") vehicles, on the other hand, utilize alternative power sources to propel the vehicle and, thus, minimize or eliminate reliance on a fossil-fuel based engine for tractive power.

A full electric vehicle (FEV)—colloquially branded as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging hardware in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered electric traction motor. Since hybrid-type, electric-drive vehicles are able to derive their power from sources other than the engine, hybrid electric vehicle engines may be turned off, in whole or in part, while the vehicle is propelled by the electric motor(s).

High-voltage (HV) electrical systems govern the transfer of electricity between each traction motor and a rechargeable traction battery pack (also referred to as "electric-vehicle battery" or "EVB") that stores and supplies the requisite power for operating many hybrid and full-electric powertrains. HV electric systems may employ a front-end DC-to-DC power converter that is electrically connected to the vehicle's traction battery pack(s) in order to increase the supply of voltage to a high-voltage main direct current (DC) bus and an electronic power inverter module (PIM). A high-frequency bulk capacitor may be arranged across the positive and negative terminals of the main DC bus to provide electrical stability and store supplemental electrical energy. Bulk capacitor size—in terms of total capacitance—may be selected to achieve desired DC bus voltage range, peak current, and ripple voltage when operating the inverter employing, for example, a six-step mode of operation. Operation and control of multi-phase electric motor/generator units, such as permanent magnet synchronous traction motors, may be accomplished by employing the inverter to transform DC electric power to alternating current (AC) power using pulse-width modulated control signals output from a resident vehicle controller.

Various multi-speed power transmission architectures have been developed for selectively transmitting rotational power from the vehicle's prime mover to the final drive system. An available type of power transmission is the electrically-variable electric drive unit (EDU) that contains an electric motor/generator unit, epicyclic gear train elements, clutches, power electronics and, optionally, differential and axle components. The clutches govern engagement/disengagement of the gear train elements to provide for electrically-variable modes, fixed speed ratio modes, and electric-only ("battery power") modes of operation. The electronic PIM assembly is utilized to control operation of the EDU's motor/generator unit(s). Generally, the power inverter, DC-to-DC power converter, and other requisite power electronic modules are assembled remote from and subsequently mounted to the EDU. Assembly of the individual power electronic modules to the EDU may necessitate dedicated mounting hardware, electrical connectors, sealing gaskets, and housing containers to secure each module to the EDU. In order to regulate the operating temperatures of the individual power electronic modules, the EDU employs a fluid pump and dedicated plumbing to route coolant fluid into each module's discrete housing.

SUMMARY

Presented herein are electronic power module assemblies with direct-cooling heat pipe systems, torque-transmitting powertrains utilizing such power module assemblies, methods for making and methods for using such power module assemblies, and motor vehicles equipped with such power module assemblies. By way of example, there are presented power module packaging designs that employ heat pipes for thermal management of the module's individual power devices. The power module assembly is composed of multiple power devices that are mounted on exterior surfaces of a power module bracket housing. Fluidly sealed inside the bracket housing is a coolant chamber through which circulates a coolant fluid; inboard surfaces of the power devices are exposed to this coolant fluid. A discrete heat pipe is mounted to an outboard face of each power device, thermodynamically connecting that face with the internal coolant chamber of the bracket housing. In this manner, the heat pipes transfer device-generated heat to the coolant chamber to achieve double-sided direct cooling for the power devices. Polymeric O-rings may be used to fluidly seal coolant-contacting faces of the power devices and heat pipes to the bracket housing's coolant windows. As yet a further option, the heat pipes may extend vertically upwards from the power devices into fluid contact with the coolant fluid, exploiting gravitational forces to help condense vaporized working fluid inside the internal vapor cavity of the heat pipe. The power devices may be power semiconductor switching devices potted in direct-bonded copper (DBC) or direct-bonded aluminum (DBA); each heat pipe may be brazed or soldered directly to a respective DBC/DBA layer.

Attendant benefits for at least some of the disclosed concepts may include novel power module packaging designs that provide efficient direct cooling to opposing sides of each power device for optimized thermal management. In so doing, disclosed power module designs concomitantly increase the power density and operational life expectancy of the HV electrical system. Disclosed direct-cooling heat pipe systems enable the power module to use high-voltage insulated gate bipolar transistors (IGBT) and wideband gap (WBG) devices, which in turn helps to improve powertrain performance. Other attendant benefits may include power module architectures that help to minimize electrical system complexity and associated costs while reducing gross vehicle weight and providing a more efficient powertrain system with improved vehicle range and fuel economy.

Aspects of this disclosure are directed to electronic power module assemblies with direct-cooling heat pipe systems for optimized power device thermal management. In an example, a power module assembly is presented for controlling the transfer of electrical power back-and-forth between a power source (e.g., one or more rechargeable battery packs) and an electrical load (e.g., one or more electric motors). The power module assembly includes a protective outer housing with an internal coolant chamber that circulates therethrough a coolant fluid. Defined through one or more sidewalls of the module housing are multiple coolant windows that are fluidly connected to the coolant chamber. One or more power devices (e.g., semiconductor switching devices) are mounted to the exterior of the module housing, each fluidly sealed to a respective coolant window with the power device's inboard surface exposed to the coolant fluid circulating through the internal coolant chamber. Each power device is selectively operable to modify electric current transmitted between the power source and electrical load. The power module assembly also includes one or more heat pipes, each of which includes an outer casing with a first casing segment that is mounted to an outboard surface of a respective power device, and a second casing segment that is fluidly sealed to a respective coolant window of the module housing and exposed to the coolant fluid.

Additional aspects of this disclosure are directed to motor vehicles equipped with electronic power module assemblies with direct-cooling heat pipe systems. As used herein, the terms "vehicle" and "motor vehicle" may be used interchangeably and synonymously to include any relevant vehicle platform, such as passenger vehicles (ICE, REV, FEV, BEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with multiple road wheels and other standard original equipment. Mounted on the vehicle body is one or more electric traction motors that operate alone (e.g., for FEV powertrains) or in conjunction with an internal combustion engine assembly (e.g., for HEV powertrains) to selectively drive one or more of the road wheels to thereby propel the vehicle. Also mounted on the vehicle body is one or more rechargeable traction battery packs that selectively store and transmit electric current to power the traction motor(s). The battery pack(s) and motor(s) may be interconnected via a high-voltage electric circuit.

Continuing with the discussion of the above example, the vehicle also includes a power module assembly that governs electric exchanges between the traction battery pack(s) and motor(s). This power module assembly includes a module housing, which is attached to the vehicle body and includes an internal coolant chamber that circulates coolant fluid. The module housing is fabricated with multiple coolant windows that are fluidly connected to the coolant chamber. One or more power semiconductor devices are mounted to the module housing, each fluidly sealed to a respective coolant window with an inboard surface thereof exposed to the coolant fluid. Each power device is operable to modulate the transfer of electric current between a traction motor and a battery pack. To mitigate device-generated heat, the power module assembly includes one or more heat pipes, each of which is fabricated with a working fluid, a vapor canister, and a wicking medium that are sealed inside a protective outer casing. Each outer casing has a first casing segment that is mounted to an outboard surface of a respective power device, and a second casing segment, distinct from the first casing segment, that is fluidly sealed to a respective coolant window and exposed to the coolant fluid. Notably, disclosed power module assemblies may be employed for both automotive and non-automotive applications alike.

Also presented herein are methods for manufacturing and methods for operating any of the disclosed power module assemblies, powertrains, and/or motor vehicles. In an example, a method is presented for constructing a power module assembly for controlling the transfer of electrical power between a power source and an electrical load. This representative method includes, in any order and in any combination with any of the above and below disclosed options and features: receiving a module housing with an internal coolant chamber configured to circulate a coolant fluid, the module housing defining first and second coolant windows fluidly connected to the coolant chamber; mounting a power device to the module housing, the power device being operable to modify an electric current transmitted between the power source and the electrical load; fluidly sealing the power device to the first coolant window such that an inboard surface of the power device is exposed to the coolant fluid; mounting a first casing segment of an outer casing of a heat pipe to an outboard surface of the power device; and, fluidly sealing a second casing segment of the outer casing to the second coolant window of the module housing such that the heat pipe is exposed to the coolant fluid.

The above summary does not represent every embodiment or every aspect of this disclosure. Rather, the foregoing summary merely provides examples of some of the novel concepts and features set forth herein. The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the present disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
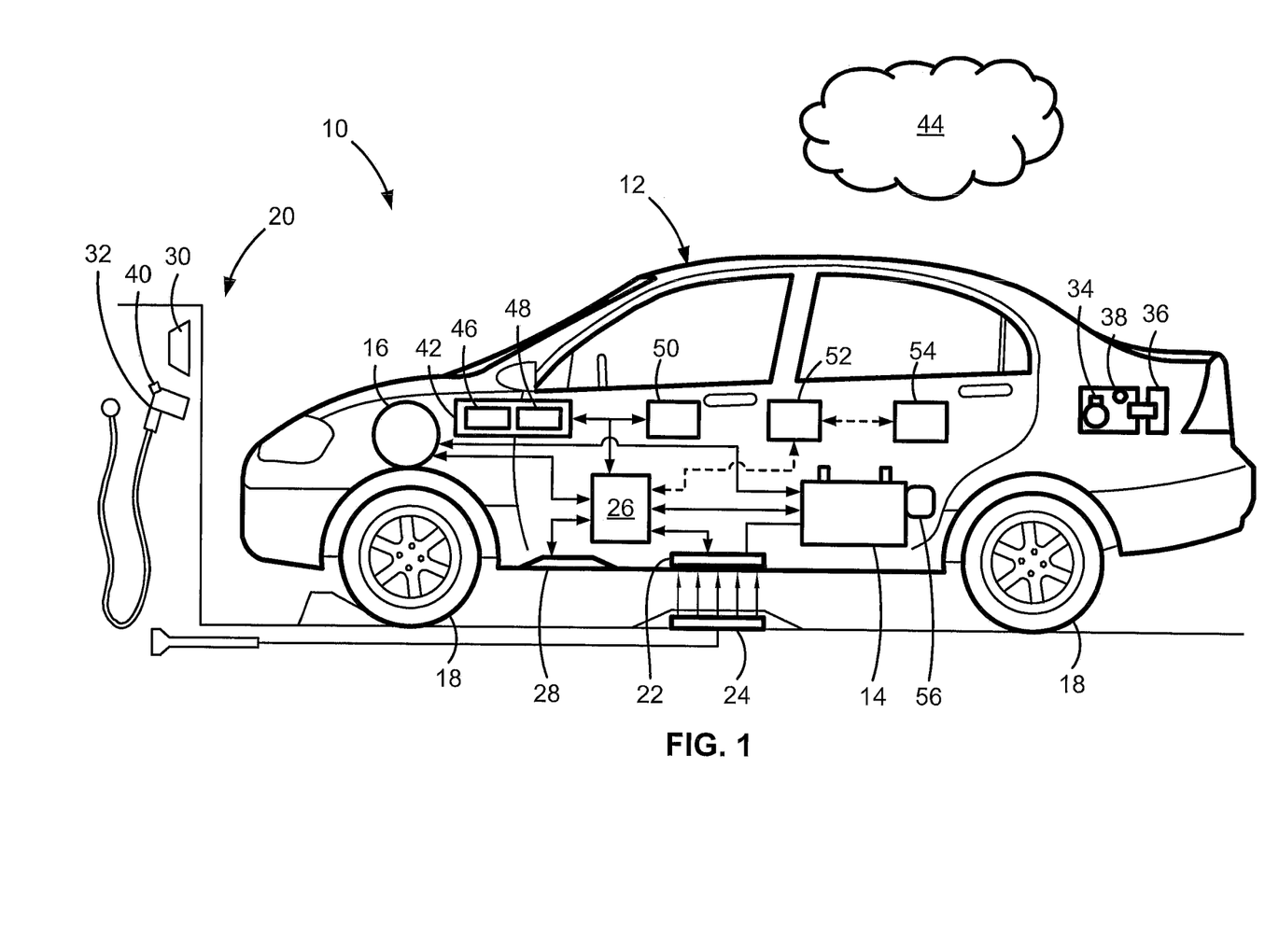
FIG. 1 is a partially schematic, side-view illustration of a representative electric-drive vehicle with a traction motor connected to a rechargeable traction battery pack by a high-voltage electrical system in accordance with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a sedan-style, hybrid electric passenger vehicle. Packaged within a vehicle body 12 of the automobile 10, e.g., inside a passenger compartment, trunk compartment, or dedicated battery compartment, is a traction battery pack 14 that powers one or more electric motor-generator units 16 that drive one or more of the vehicle's road wheels 18 to thereby propel the vehicle 10. The illustrated automobile 10—also referred to herein as "motor vehicle" or "vehicle" for short—is merely an exemplary application with which features of this disclosure may be practiced. In the same vein, implementation of the present concepts for the specific electric-drive powertrain architecture presented in the drawings should also be appreciated as an exemplary application of the disclosed concepts. As such, it will be understood that aspects and features of this disclosure may be applied to other powertrain architectures, and implemented for any logically relevant type of motor vehicle. Moreover, only select components of the vehicle, powertrain, and power module assembly have been shown and will be described in additional detail herein. Nevertheless, the vehicles and systems discussed below may include numerous additional and alternative features, and other commercially available peripheral components, for example, to carry out the various protocols and/or algorithms of this disclosure.

FIG. 1 is a simplified illustration of the electric-drive vehicle 10 docked at and operably coupled to a vehicle charging station 20 for recharging an onboard rechargeable energy source, such as a high-voltage direct current (DC) traction battery pack 14. Traction battery pack 14 may take on many suitable configuration, including an array of lead-acid, lithium-ion, or other applicable type of rechargeable electric vehicle battery (EVB). To provide an operable coupling between the traction battery pack 14 and vehicle charging station 20, the vehicle 10 may include an inductive charging component 22, e.g., with an integrated induction coil, that is mounted to the underside of the vehicle body 12. This inductive charging component 22 functions as a wireless charging interface that is compatible with a wireless charging pad or platform 24, e.g., with an internal EMF coil, of the vehicle charging station 20. In the illustrated example, the wireless charging pad/platform 24 is located on the floor of the vehicle charging station 20, positioned in accordance with a "target location" that serves as a desired parking location for purposes of efficient and effective wireless charging of the vehicle 10. In particular, FIG. 1 depicts the vehicle 10 parked in proper fore-aft alignment and in proper starboard-port alignment that helps to ensure the inductive charging component 22 is substantially aligned in both lateral and longitudinal dimensions with the wireless charging pad/platform 24.

The vehicle charging station 20 may employ any heretofore and hereinafter developed type of wired and wireless charging technology, including inductive charging, radio charging, and resonance charging, as some non-limiting examples. In accordance with electromagnetic induction charging technology, the representative wireless charging pad 24 of FIG. 1 may be activated with electric current to generate an alternating electromagnetic field proximate the inductive charging component 22. This magnetic field, in turn, induces an electric current in the inductive charging component 22 of the vehicle 10. The induced current may be filtered, stepped-down, and/or phase-shifted by in-vehicle electrical modulation circuitry to charge the traction battery pack 14 or other energy source of the vehicle 10 (e.g., a standard 12V lead-acid starting, lighting, and ignition (SLI) battery, an auxiliary power module, etc.). A pack cooling system 56 may be integrated to the traction battery pack 14 to provide substantially uniform cooling of the modules within the pack, e.g., by providing a metered flow of coolant fluid.

Traction battery pack 14 stores energy that can be used for propulsion by the traction motor 16 and for operating other vehicle electrical systems. The traction battery pack 14 is communicatively connected (wired or wirelessly) to one or more vehicle controllers, represented in FIG. 1 by electronic control unit (ECU) 26, that regulates the operation of various onboard vehicle components. Contactors controlled by the ECU 26, for example, may isolate the traction battery pack 14 from other components when opened, and connect the traction battery pack 14 to other components when closed. The ECU 26 is also communicatively connected to each electric motor-generator unit (MGU) 16 to control, for example, bi-directional transfer of energy between the traction battery pack 14 and MGU 16. For instance, traction battery pack 14 may provide a DC voltage while the MGU 16 may operate using a three-phase AC current; in such an instance, ECU 26 converts the DC voltage to a three-phase AC current for use by the motor-generator 16. In a regenerative mode where the MGU 16 act as an electric generator, the ECU 26 may convert three-phase AC current from the MGU 16 to DC voltage compatible with the traction battery pack 14. The representative ECU 26 is also shown communicating with charging component 22, for example, to condition the power supplied from the vehicle charging station 20 to the battery pack 14 to help ensure proper voltage and current levels. The ECU 26 may also interface with the charging station 20, for example, to coordinate the timing, amount, and user-preferences for delivery of power to and from the vehicle 10.

Vehicle charging station 20 of FIG. 1 also offers wired charging for electric vehicle 10 via a "plug-in" electrical connector 32, which may be any one of a number of different commercially available electrical connector types. By way of non-limiting example, electrical connector 32 may be a Society of Automotive Engineers (SAE) J1772 (Type 1) or J1772-2009 (Type 2) electrical connector with single or split phase modes operating at 120 to 240 volts (V) with alternating current (AC) at up to 80 amperes (A) peak current for conductive vehicle charging. Furthermore, the charging connector 32 can also be designed to meet the standards set forth in International Electrotechnical Commission (IEC) 62196-3 Fdis and/or IEC 62196-2, as well as any other presently applicable or hereafter mandated standards. A charge port 34 accessible on the exterior of vehicle body 12 is a wired charging interface functioning as an electrical inlet into which electrical connector 32 may be plugged or otherwise mated. This port 34 enables a user to easily connect and disconnect the vehicle 10 to/from a readily available AC or DC source, such as a public utility power grid, via charging station 20. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the electric-drive vehicle 10 may monitor wired/wireless charging availability, wireless power quality, and other related variables that may affect charging. According to the illustrated example, the vehicle ECU 26 of FIG. 1 communicates with and receives sensor signals from a monitoring system, represented herein by one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with assorted sensors packaged at similar or alternative locations to that which are shown in the drawings. A CPD sensor 38 mounted by the charge port 34 may sense, and be polled or read by the vehicle's ECU 26 to determine, a door status (open/closed) of the CPD 36. Additionally, a latching button 40, which helps to physically attach and secure the electrical connector 32 to the charge port 34, may include an internal switch (e.g., an SAE S3 type switch) that functions as a sensing device to detect whether or not the electrical connector 32 is operatively connected to the charge port 34.

The representative vehicle 10 of FIG. 1 may be originally equipped with a vehicle telecommunication and information ("telematics") unit 42 that wirelessly communicates (e.g., via cell towers, base stations and/or mobile switching centers (MSCs), etc.) with a remotely located or "off-board" cloud computing service system 44. Acting as both a user-input device and a vehicle-output device, telematics unit 42 may be equipped with an electronic video display device 46 and assorted input controls 48 (e.g., buttons, knobs, switches, trackpads, keyboards, touchscreens, etc.). These telematics hardware components may function, at least in part, as a resident vehicle navigation system, e.g., to enable assisted and/or automated vehicle navigation, and as a human/machine interface (HMI), e.g., to enable a user to communicate with the telematics unit 42 and other systems and system components of the vehicle 10. Optional peripheral hardware may include a microphone that provides a vehicle occupant with the ability to input verbal or other auditory commands; the vehicle 10 may be equipped with an embedded voice-processing unit programmed with a computational speech recognition software module. A vehicle audio system with one or more speaker components may provide audible output to a vehicle occupant and may be either a stand-alone device dedicated for use with the telematics unit 42 or may be part of a general audio system.

With continuing reference to FIG. 1, telematics unit 42 is an onboard computing device that provides a mixture of services, both individually and through its communication with other networked devices. Telematics unit 42 may be generally composed of one or more processors, each of which may be embodied as a discrete microprocessor, an application specific integrated circuit (ASIC), a dedicated control module, etc. Vehicle 10 may offer centralized vehicle control via ECU 26 that is operatively coupled to one or more electronic memory devices 50, each of which may take on the form of a CD-ROM, magnetic disk, IC device, semiconductor memory (e.g., various types of RAM or ROM), etc., with a real-time clock (RTC). Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 52. Close-range wireless connectivity may be provided via a short-range wireless communication device (e.g., a BLUETOOTH® unit or near field communications (NFC) transceiver), a dedicated short-range communications (DSRC) component, and/or a dual antenna, all of which are collectively represented at 54. The communication devices described above may provision data exchanges as part of a periodic broadcast in a Vehicle-to-Vehicle (V2V) or vehicle-to-everything (V2X) communication system, e.g., Vehicle-to-Infrastructure (V2I), Vehicle-to-Pedestrian (V2P), Vehicle-to-Device (V2D), etc.

Figure 2:
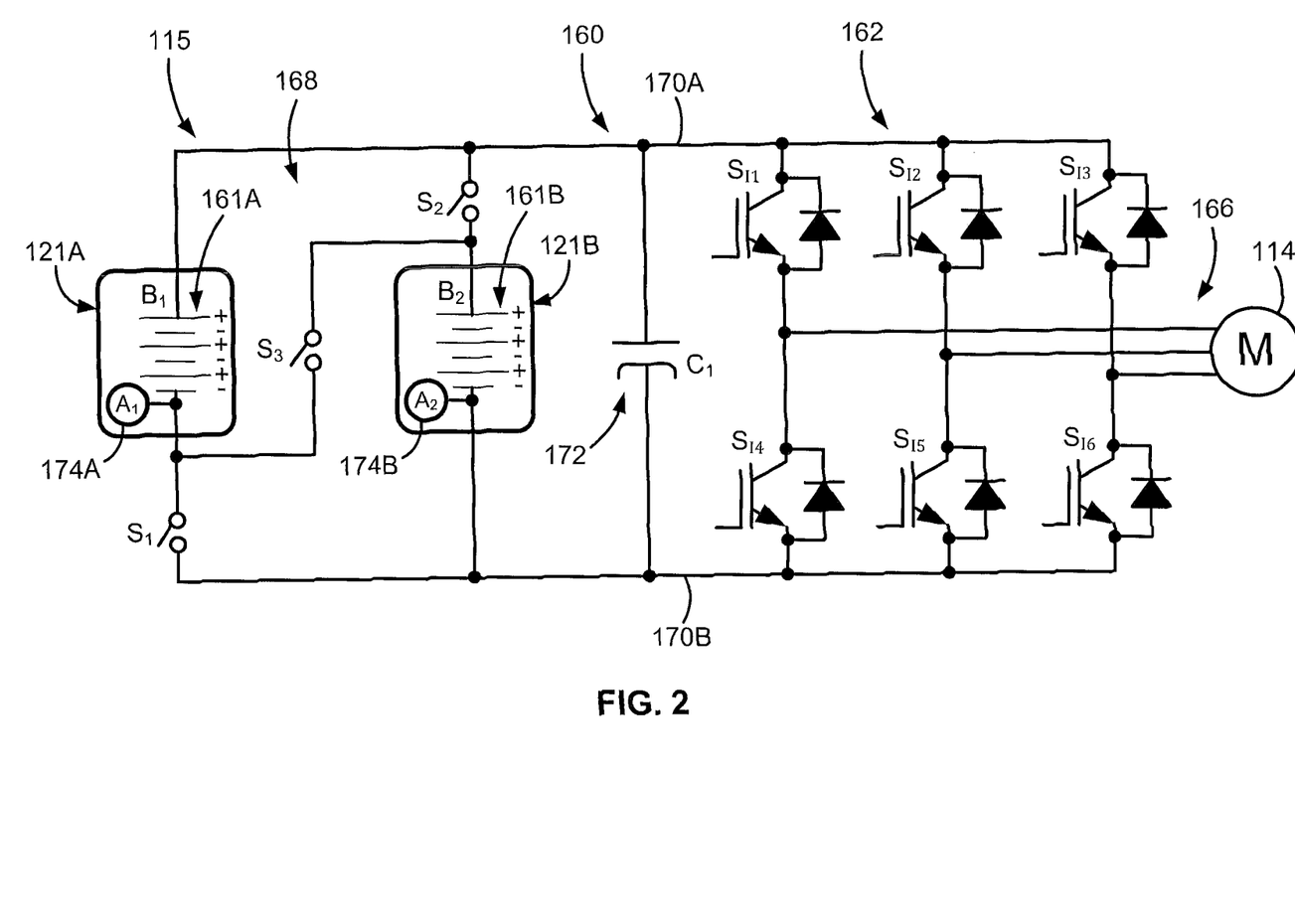
FIG. 2 is a schematic diagram of a representative electrified powertrain system with multiple traction battery packs connected to an electric motor/generator unit via a high-voltage main DC bus, DC bulk capacitor, and traction power inverter module (TPIM) assembly in accordance with aspects of the present disclosure.

Turning next to FIG. 2, there is shown a representative electrified powertrain architecture with a rechargeable energy storage system (RESS) 115 that is adapted for storing high-voltage, high ampere-hour electrical energy used for driving an electric load, such as MGU 16 of vehicle 10 of FIG. 1. RESS 115 may be a deep-cycle, high-ampere capacity battery system rated for approximately 400 to 800 VDC or more, for example, depending on a desired vehicle range, gross vehicle weight, and power ratings of the various loads drawing electrical power from the RESS 115. To this end, the RESS 115 may include multiple high-voltage, independently-rechargeable battery packs 121A and 121B that are selectively electrically connectable to a polyphase electric machine, such as a three-phase permanent magnet (PM) traction motor (M) 114. While two traction battery packs 121A, 121B and one traction motor 114 are shown in FIG. 2 for illustrative simplicity, a single traction battery pack or three or more traction battery packs may be used within RESS 115 to power any number of electric traction motors.

The first (B1) and second (B2) traction battery packs 121A, 121B may be connected in electrical parallel with respect to a high-voltage main DC bus 160 and a power inverter module (PIM) 162 for governing the transmission of electrical energy to and from the traction motor 114. Each pack 121A, 121B comes equipped with a respective stack of battery cells 161A and 161B, including lithium ion cells, lithium polymer cells, or any other rechargeable electrochemical cells providing a sufficiently high-power density, as well as any requisite conductive battery support structure, battery pack cooling system, and current conditioning hardware. The number and arrangement of battery cells 161A, 161B in each pack 121A, 121B may vary with the intended application of the RESS 115, for instance with 96 or more such cells per pack used in certain high-voltage applications. It should be appreciated that the representative powertrain architecture of FIG. 2 may include any of the options and features described above with respect to the vehicle drive system of FIG. 1, and vice versa.

A DC-to-AC and AC-to-DC power inverter module 162, which may be part of a traction power inverter module (TPIM), connects via polyphase windings 166 to traction motor 114 to transmit electrical energy between the motor 114 and battery packs 121A, 121B. The power inverter module 162 may incorporate multiple power inverters and respective motor control modules operable to receive motor control commands and control inverter states therefrom for providing motor drive or regenerative functionality. The power inverter module 162 may comprise a set of semiconductor switches $S_{11}$-$S_{16}$ (also referred to herein as "inverter switches") that cooperatively convert direct current power from the energy storage devices—battery packs 121A, 121B—to alternating current power for powering the electric machine 114 via high-frequency switching. Each semiconductor switch $S_{11}$-$S_{16}$ may be embodied as a voltage-controlled bipolar switching device in the form of insulated gate bipolar transistor (IGBT), metal-oxide semiconductor field effect transistor (MOSFET), wideband gap (WBG) device, or other suitable switch having a corresponding gate to which a gate signal is applied to change the on/off state of a given switch. There is typically at least one semiconductor switch for each phase of a three-phase electric machine.

The traction battery packs 121A, 121B include a set 168 of solid-state relay switches or contactors S1-S3 (also referred to herein as "pack contactor switches") that are independently responsive to signals from a suitable controller or dedicated control module to govern the electrical output of the battery system. Contactors/switches S1-S3 are adapted to close under electrical load so as to ensure the instantaneous or near instantaneous delivery of electrical power, e.g., to a vehicle's propulsion system and to drive any number of the in-vehicle accessories. As with the semiconductor inverter switches within the PIM 162, pack contactor switches 168 may be constructed of highly efficient switching devices, such as wide-gap gallium nitride (GaN) or silicon carbide (SiC) MOSFETs, IGBTs, or other suitable electronic devices. Respective real-time electrical currents of the traction battery pack 121A, 121B of FIG. 2 may be measured using dedicated first ($A_1$) and second ($A_2$) current sensors 174A and 174B, which may be integrated within a battery housing of a corresponding battery pack.

A DC output voltage of the traction battery packs 121A, 121B is delivered across positive and negative voltage bus rails 170A and 170B, respectively, with a fixed-type, high-frequency DC bulk capacitor (C1) 172 placed in electrical parallel with both traction battery packs 121A, 121B. The high-frequency DC bulk capacitor 172 is portrayed in FIG. 2 as a single device for ease of illustration. It should be appreciated, however, that the DC bulk capacitor 172 may be composed of multiple capacitor devices that are electrically arranged in series, parallel, or any other suitable electrical configuration to provide electrical capacitance in the electric circuit between positive and negative conductors of the high-voltage main DC bus 160. A RESS sensing system (not shown) may be arranged to monitor operating parameters of the main DC bus 160, PIM 162, and bulk capacitor 172, such as a bus electrical potential measured across the positive and negative bus rails 170A and 170B of the high-voltage main DC bus 160.

Capacitor size of the DC bulk capacitor 172 may be described in terms of its total capacitance, and may be selected based upon any number of variables, including expected voltage range, peak current, and ripple voltage amplitude across the main DC bus 160. In this regard, capacitance of a bulk capacitor may also be determined in relation to parameters such as peak voltage, root mean square (RMS) current, minimum and maximum bus current levels, operating temperatures, and other factors. As such, the size of the DC bulk capacitor 172, in terms of its total capacitance, may be selected based upon expected DC bus voltage ripple when operating the power inverter module 162 employing, for example, a six-step mode of operation. As yet another option, the DC bulk capacitor 172 may take on the form of any suitable electrical capacitive storage device, be it electrolytic devices, aluminum devices, ceramic devices, plastic capacitance devices, wound film devices, etc. Furthermore, the conductive material employed by each capacitor device may comprise any suitable electrically conductive material, such as aluminum, copper, gold, zinc, or an alloy or composite of the foregoing metallic materials.

Figure 3:
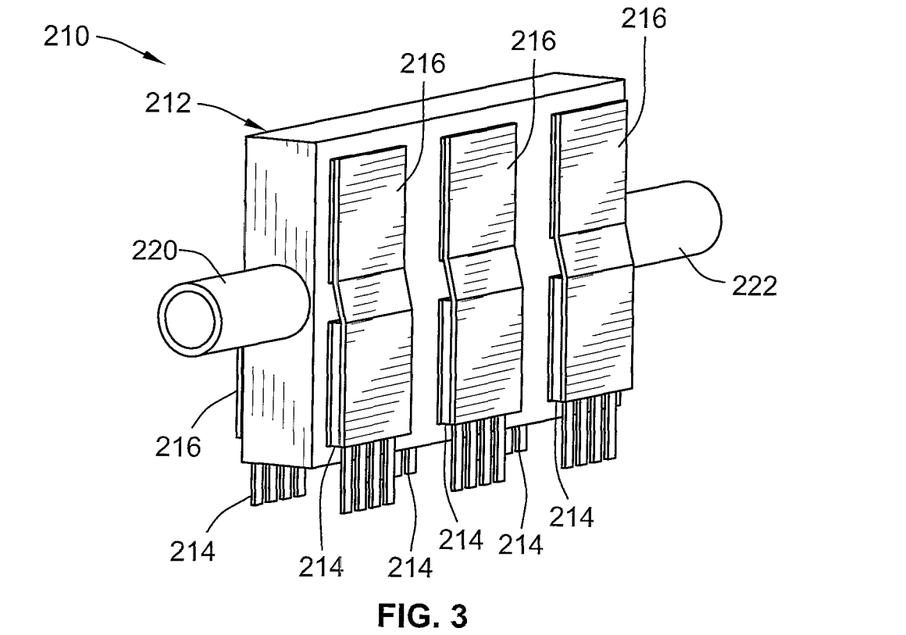
FIG. 3 is an elevated, perspective-view illustration of a representative high-voltage power module assembly with a direct-cooling heat pipe system for power device thermal management in accord with aspects of the disclosed concepts.
Figure 4:
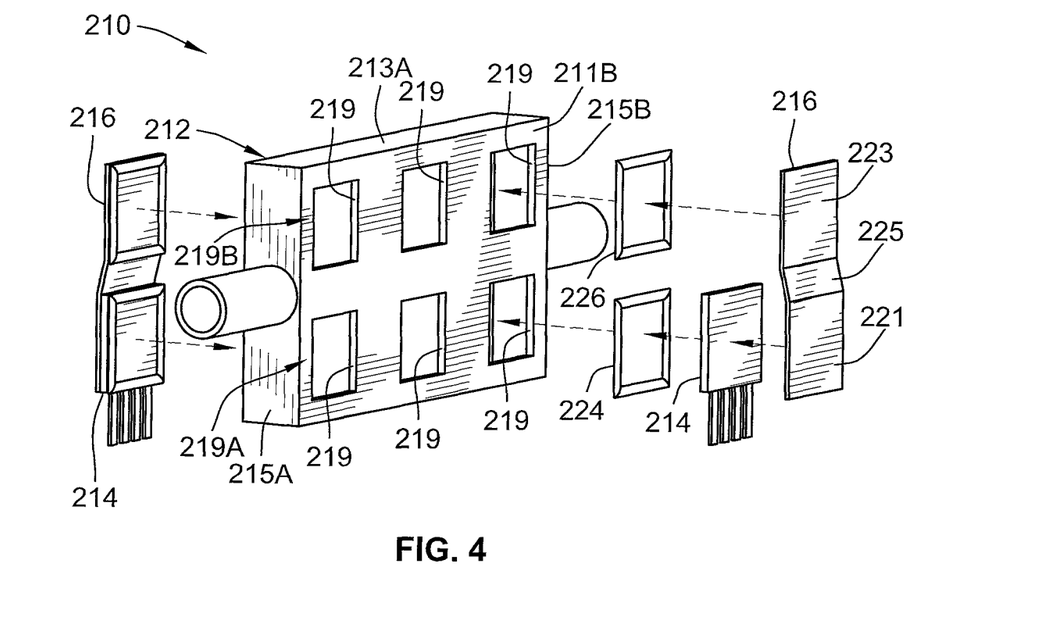
FIG. 4 is a partially exploded, perspective-view illustration of the representative power module assembly of FIG. 3.
Figure 5:
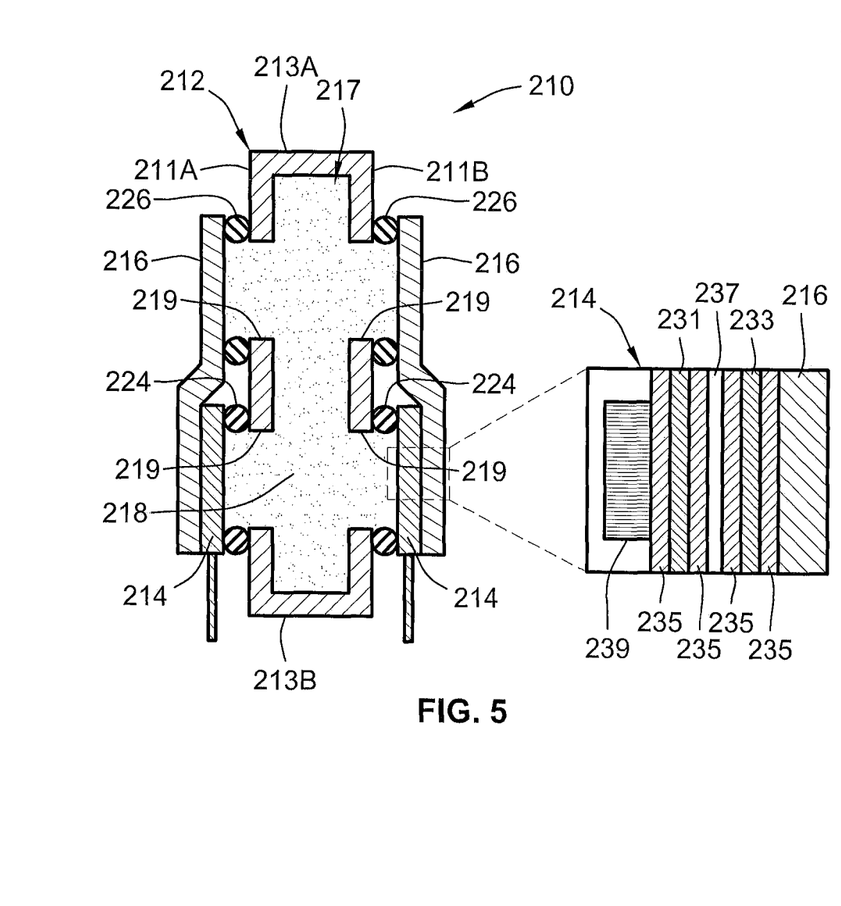
FIG. 5 is a sectional, side-view illustration of the representative power module assembly of FIG. 3.

FIGS. 3-5 present a novel electronic power module assembly, represented herein by power inverter module 210, that is equipped with a direct-cooling heat pipe system for optimized thermal management of the module's individual power devices. Power inverter module 210 may be electrically interposed between a power source, such as traction battery pack 14 of FIG. 1 or RESS 115 of FIG. 2, and an electrical load, such as MGU 16 of FIG. 1 or traction motor 114 of FIG. 2, for maintaining high-voltage, high-frequency power transmission with smoothed AC/DC current conversion. As indicated above, the power inverter module 210 may be incorporated into the representative applications of FIGS. 1 and 2 or, alternatively, may be implemented into other commercial applications, including power utility grids, photovoltaic balancing systems, fuel cell generators, etc. In the same vein, while illustrated and described as a traction power inverter module, it is envisioned that the novel features discussed below with respect to FIGS. 3-6 may be implemented for other power module assemblies, including an on-board charge module (OBCM), a Single Power Inverter Module (SPIM), a BAS Power Inverter Module (BPIM), a Rear Power Inverter Module (RPIM), etc.

With collective reference to FIGS. 3 and 4, power inverter module 210 assembly is constructed with, among other things, a protective outer housing 212, one or more power semiconductor switching devices 214, and one or more thermal-transfer heat pipes 216. Although shown comprising six power devices 214 with six heat pipes 216, it is envisioned that the power inverter module 210 may include greater or fewer than the illustrated number of power devices 214 and heat pipes 216. The module housing 212 may be formed from an electrically insulative material, such as plastic, epoxy, and/or epoxy-impregnated fiber glass, or formed from metallic materials, including casted aluminum. As shown, housing 212 is fabricated with multiple outer housing walls: left and right sidewalls 211A and 211B, respectively (FIG. 5); top and bottom walls 213A and 213B, respectively (FIG. 5); and, front and back walls 215A and 215B, respectively (FIG. 4). These housing walls cooperatively define an internal coolant chamber 217 (FIG. 5) through which circulates a heat-mitigating coolant fluid 218, e.g., an ethylene glycol-based coolant. In this regard, a coolant inlet port 220 provides a fluid connection point to, and thereby receives coolant fluid from, a coolant source (e.g., coolant feed line, electric pump, and heat exchanger). Coolant fluid is returned to the coolant source (e.g., coolant return line and coolant fluid volume) from the power inverter module 210 via a coolant outlet port 222 projecting from the housing 212 on an opposite side of the inlet port 220. It should be appreciated that the geometric shape, size and configuration of the module housing 212 may be varied from that shown in the drawings to accommodate the design constraints of other applications.

Module housing 212 of FIGS. 3-5 is also fabricated with coolant access windows that provide fluid interfaces between the coolant chamber 217 and both the power devices 214 and heat pipes 216. In accord with the illustrated example, the housing's outermost sidewalls 211A, 211B each define therethrough six coolant windows: a bottom (first) row 219A of three (first) coolant windows 219; and, a top (second) row 219B of three (second) coolant windows 219. The number of coolant windows 219, as well as their respective arrangements, sizes, and orientations, may be varied from the illustrated examples without departing from the scope of this disclosure. In addition to providing an interface to heat-exchanging coolant fluid, the power inverter module's outer housing 212 provides mechanical support, corrosion resistance, vibration protection, thermal protection, etc., to the device mounted thereto. Power inverter module 210 may include a number of optional features, such as an electrically conductive base plate (not shown) onto which the module housing 212 is rigidly mounted using, for example, threaded fasteners. An active (drain) terminal of each power device 214 may be electrically connected to this base plate, while an active (source) terminal of each device 214 is electrically connected to conductive PIM tabs, each of which provides a terminal connection point with a polyphase winding.

Mounted to the module housing 212 is at least one or, as shown, six power devices 214 that are operable, singly and collectively, to modulate the transfer of electric current between an electrical power source and an electrical load. In the representative TPIM implementation, each power device 214 is an integrated circuit (IC) based semiconductor switching device, such as an IGBT device, WBG device, MOSFET device, and the like. One example is the Hybrid-PACK™ DSC S2 Half-Bridge Power Module produced by Infineon Technologies AG. It may be desirable, for at least some applications, that all six power devices 214 be substantially identical with one another. Although not shown, other electronic devices may be operatively supported on the module housing 212, such as a contact resistor board, motor control units, etc.

The power devices 214 are each securely mounted, e.g., via compression hardware, mounting bracket, and/or mechanical fasteners, on an outboard-facing surface of an outer housing wall. In particular, each power device 214 is seated against an exterior face of the module housing 212, extending across and covering a respective coolant window 219, and sandwiched between a respective heat pipe 216 and one of the housing sidewalls 211A, 211B. A rectangular (first) polymeric O-ring 224 is compressed between and, thus, fluidly seals the power device 214 to one of the coolant windows 219 in the bottom row 219A of windows 219. In so doing, inboard-facing surfaces of the power devices 214 are directly exposed to the coolant fluid 218 inside the internal coolant chamber 217, as best seen in FIG. 5. Each O-ring 224 seal may be sized to be just larger than the perimeter of a coolant window 219 and just smaller than the perimeter of the power device's inboard surface to ensure the largest contact surface area between the coolant fluid 218 and power device 214.

With continuing reference to FIGS. 3-5, the heat pipes 216 provide thermodynamic conduits that interface the outboard-facing surfaces of the power devices 214 with the coolant fluid 218 circulating through the module housing's internal coolant chamber 217. In accord with the illustrated example, the power inverter module 210 is constructed with six individual, self-contained heat pipes 216, each of which is dedicated to a single one of the power devices 214. It is envisioned, however, that the power inverter module 210 may comprise greater or fewer than six heat pipes 216, which may take on alternative shapes, sizes and packaging locations from the illustrated configurations. For instance, select sets of power devices 214—e.g., first and second sets of three power devices 214 mounted to the left and right sidewalls 211A, 211B—may each share one enlarged, combined heat pipe.

Figure 6:
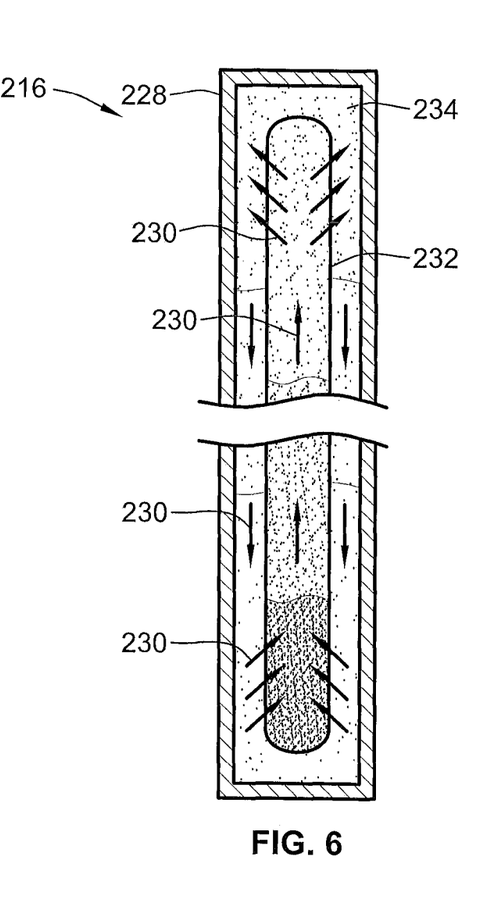
FIG. 6 is a sectional, side-view illustration of one of the heat pipes in the representative power module assembly of FIG. 3.

Similar to the power devices 214 of FIGS. 3-5, it may be desirable, for at least some applications, that all six heat pipes 216 be substantially identical with one another. As best seen in FIG. 6, for example, each heat pipe 216 may be composed of a rigid, thermally conductive outer casing 228 (e.g., formed from extruded copper) with a working fluid (arrows 230), a permeable vapor canister 232, and a fluid-wicking medium 234 packaged inside the outer casing 228. The wicking medium 234, which is disposed between the outer surface of the vapor canister 232 and the interior surface of the outer casing 228, may be fabricated from an assortment of suitable materials, such as a roving of fine fibers, a wrapped textile, intertwined metal wires, a mesh screen, directly sculptured from an inner surface of the casing 228 for a grooved wick, copper particles for a sintered powder wick, etc. The working fluid 230 may comprise a mixture of water and refrigerant. Each heat pipe 216 may be a fluidly sealed, discrete unit that lacks fluid porting for exchanging coolant fluid with the internal coolant chamber 217. The outer casing 228 is approximately the same width as the outboard-facing surface of a power device 214, and is approximately the same height as the distance between distal ends of two vertically neighboring windows 219.

The outer casing 228 of the heat pipe 216 is an elongated, polyhedral structure with a substantially flat, rectangular lower (first) casing segment 221 located at a bottom (first) end of the casing 228, and a substantially flat, rectangular upper (second) casing segment 223 located at a top (second)

end of the casing 228. A substantially flat, stepped casing segment 225 adjoins, extends between, and structurally connects the lower and upper casing segments 221, 223 to each other. As shown, the stepped casing segment 225 extends at an oblique angle (e.g., about 45 degrees) from proximal edges of the lower and upper casing segments 221, 223. It may be desirable, for at least some applications, that the transverse width of the casing segments 221, 223 be substantially the same and approximately equal to the transverse width of the power device 214. The heat pipe's lower (first) casing segment 221 is mounted directly to the outboard-facing surface of a respective power device 214, e.g., via brazing, soldering, welding, fastener, adhesive, etc. Comparatively, the upper (second) casing segment 223 is fluidly sealed to a respective coolant window 219 in the second row 219B of windows 219 and, thus, directly exposed to the coolant fluid 218. For example, a rectangular (second) polymeric O-ring 226 is shown compressed between and, thus, fluidly seals the heat pipe 216 to its corresponding coolant window 219.

During operation of the power inverter module 210 assembly, the power devices 214 will generate a significant amount of heat. The power devices 214 will convect a portion of this heat through its inboard-facing surface directly to the coolant fluid 218 via the coolant windows 219 in the first row 219A of windows 219. A portion of this device-generated heat will also be transferred through the outboard-facing surfaces of the power devices directly to the heat pipes 216. This heat will pass through the lower end of the heat pipe 216, causing the working fluid 230 sealed within the outer casing 228 to evaporate. When the working fluid 230 is vaporized from absorbing device-generated heat, the wicking medium 234 functions to pass the working fluid 230 into the vapor canister 232. The vaporized working fluid 230 migrates upwards through the vapor canister 232 and condenses at the fluid-cooled upper end of the heat pipe 216. When condensed, the wicking medium 234 functions to draw the working fluid 230 out of the vapor canister 232. The liquefied working fluid 230 will then migrate downwards, under the force of gravity, through the outer casing 228 to the lower end of the heat pipe 216 to start the cycle anew.

Aspects of the disclosed concepts are also directed to methods for making and methods for using any of the disclosed vehicles, powertrains, and power modules. Some or all of the operations described in further detail below may be representative of an algorithm or workflow process that corresponds to processor-executable instructions that may be stored, for example, in main, auxiliary and/or remote memory, and executed, for example, by a resident or remote controller, processing unit, control logic circuit, or other module or network of devices, to perform any or all of the above or below described functions associated with the disclosed concepts. It should be recognized that the order of execution of these operations may be changed, additional operations may be added, and some of the operations described may be modified, combined, or eliminated.

A method of assembling a power module assembly, such as PIM 210 of FIGS. 3-5, may start with fabricating, retrieving, or loading (collectively "receiving") a module housing, such as protective outer housing 212, with an internal coolant chamber designed to circulate therethrough a coolant fluid. As noted above, the module housing includes multiple coolant windows, such as first and second rows 219A, 219B of windows 219, that fluidly connect to the coolant chamber. One or more power devices, such as power semiconductor switching devices 214, are mounted to one or more external surfaces of the module housing. Each power device is fluidly sealed to a respective coolant window such that an inboard surface of the power device is exposed to the circulating coolant fluid. One or more heat pipes, such as thermal-transfer heat pipes 216, are also mounted to one or more of the module housing's external surfaces. This may comprise mounting a casing segment of the heat pipe's outer casing to an outboard surface of a power device, and fluidly sealing another casing segment of the outer casing to a respective coolant window of the module housing such that the heat pipe is exposed to the circulating coolant fluid.

The aforementioned method may also comprise forming the outer casing of the heat pipe with upper and lower casing segments based on the dimensions of the power devices and the coolant windows. The method may optionally comprise potting the power device in a layer of direct-bonded copper (DBC) or direct-bonded aluminum (DBA). For instance, the inset view of FIG. 5 portrays the power device 214 as a layered laminate structure with first and second substrates 231 and 233 (e.g., formed from aluminum oxide ($Al_2O_3$), aluminum nitride (AlN), or silicon nitride ($Si_3N_4$)), each of which is sandwiched between two DBC layers 235 of copper-aluminum (CuAl) alloy, and bonded to an opposing face of a power device switch 237. In this instance, the first casing segment of the heat pipe 216 is shown brazed/soldered directly to an outboard DBC layer 235. A pin fin 239 is mounted to an inboard DBC layer 235, projecting from the substrate 231 on an opposite side of the power device 214 as the heat pipe 216. As a further option, the pin fin 239 may be mounted to an inboard DBC layer or, alternatively, may be joined with another DBC layer or machined directly from a DBC layer.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A power module assembly for controlling transfer of electrical power between a power source and an electrical load, the power module assembly comprising:
    a module housing including an internal coolant chamber configured to circulate coolant fluid, the module housing defining first and second coolant windows fluidly connected to the coolant chamber;
    a power device mounted to the module housing and fluidly sealed to the first coolant window with an inboard surface of the power device exposed to the coolant fluid, the power device being operable to modify an electric current transmitted between the power source and the electrical load; and
    a heat pipe including an outer casing with a first casing segment mounted to an outboard surface of the power device and a second casing segment fluidly sealed to the second coolant window of the module housing and exposed to the coolant fluid.

2. The power module assembly of claim 1, wherein the module housing further includes a plurality of interconnected housing walls cooperatively defining the internal coolant chamber, a first of the housing walls defining therethrough the first and second coolant windows.

3. The power module assembly of claim 2, wherein the first and second coolant windows include first and second rows of first and second coolant windows, respectively, and wherein the power device includes a plurality of power devices each mounted to the module housing and fluidly sealed to a respective one of the first coolant windows in the first row.

4. The power module assembly of claim 3, wherein the heat pipe includes a plurality of heat pipes each including a respective outer casing with a first casing segment thereof mounted to an outboard surface of a respective one of the power devices and a second casing segment thereof fluidly sealed to a respective one of the second coolant windows in the second row.

5. The power module assembly of claim 2, wherein the module housing further includes a coolant inlet port configured to receive the coolant fluid from a coolant source, and a coolant outlet port configured to transfer the coolant fluid to the coolant source.

6. The power module assembly of claim 1, further comprising a first polymeric O-ring interposed between and fluidly sealing the power device to the first coolant window, and a second polymeric O-ring interposed between and fluidly sealing the heat pipe to the second coolant window.

7. The power module assembly of claim 1, wherein the heat pipe further includes a working fluid, a vapor canister, and a wicking medium packaged inside the outer casing.

8. The power module assembly of claim 7, wherein the wicking medium is disposed between the vapor canister and the outer casing and is configured to pass the working fluid, when vaporized, into the vapor canister and draw the working fluid, when condensed, out of the vapor canister.

9. The power module assembly of claim 1, wherein the outer casing of the heat pipe is an elongated structure with the first casing segment disposed at a first end thereof, the second casing segment disposed at a second end thereof, and a stepped segment extending between and connecting the first and second casing segments.

10. The power module assembly of claim 9, wherein the stepped segment extends at an oblique angle from the first and second casing segments.

11. The power module assembly of claim 1, wherein the power device includes a power semiconductor switching device potted in a layer of direct-bonded copper (DBC) or direct-bonded aluminum (DBA), and wherein the first casing segment of the heat pipe is mounted directly to the layer of DBC or DBA.

12. The power module assembly of claim 11, wherein the power device further includes a substrate and a pin fin projecting from the substrate on an opposite side of the power device as the heat pipe.

13. The power module assembly of claim 1, wherein the power device is seated on an exterior surface of the module housing, extending across and covering the first coolant window, and sandwiched between the heat pipe and the module housing.

14. An electric-drive vehicle, comprising:
a vehicle body with a plurality of road wheels attached to the vehicle body;
a traction motor attached to the vehicle body and configured to drive one or more of the road wheels to thereby propel the vehicle;
a traction battery pack attached to the vehicle body and configured to transmit an electric current with the traction motor; and a power module assembly including:
a module housing attached to the vehicle body and including an internal coolant chamber configured to circulate a coolant fluid, the module housing defining first and second coolant windows fluidly connected to the coolant chamber;
a power semiconductor switching device (power device) mounted to the module housing and fluidly sealed to the first coolant window with an inboard surface of the power device exposed to the coolant fluid, the power device being operable to modify the electric current transmitted between the traction motor and the traction battery pack; and
a two-phase, heat-transferring heat pipe device including an outer casing and a working fluid, a vapor canister, and a wicking medium sealed inside the outer casing, the outer casing including a first casing segment mounted to an outboard surface of the power device, and a second casing segment, distinct from the first casing segment, fluidly sealed to the second coolant window and exposed to the coolant fluid.

15. A method of constructing a power module assembly for controlling transfer of electrical power between a power source and an electrical load, the method comprising:
receiving a module housing with an internal coolant chamber configured to circulate a coolant fluid, the module housing defining first and second coolant windows fluidly connected to the coolant chamber;
mounting a power device to the module housing, the power device being operable to modify an electric current transmitted between the power source and the electrical load;
fluidly sealing the power device to the first coolant window such that an inboard surface of the power device is exposed to the coolant fluid;
mounting a first casing segment of an outer casing of a heat pipe to an outboard surface of the power device; and
fluidly sealing a second casing segment of the outer casing to the second coolant window of the module housing such that the heat pipe is exposed to the coolant fluid.

16. The method of claim 15, wherein the first and second coolant windows include first and second rows of first and second coolant windows, respectively, and the power device includes a plurality of power devices, and wherein mounting the power device includes mounting each of the power devices to the module housing, and fluidly sealing the power device includes fluidly sealing each of the power devices to a respective one of the first coolant windows in the first row.

17. The method of claim 16, wherein the heat pipe includes a plurality of heat pipes each including a respective outer casing, and wherein mounting the first casing segment includes mounting each of the first casing segments to an outboard surface of a respective one of the power devices, and fluidly sealing the second casing segment includes fluidly sealing each of the second casing segments to a respective one of the second coolant windows in the second row.

18. The method of claim 15, further comprising:
mounting a first polymeric O-ring between the power device and the first coolant window, and
mounting a second polymeric O-ring between the heat pipe and the second coolant window.

19. The method of claim 15, wherein the heat pipe further includes a working fluid, a vapor canister, and a wicking medium packaged inside the outer casing, the wicking medium being disposed between the vapor canister and the outer casing and is configured to pass the working fluid, when evaporated, into the vapor canister and draw the working fluid, when condensed, out of the vapor canister.

20. The method of claim 15, wherein the outer casing is an elongated structure including the first casing segment disposed at a first end thereof, the second casing segment disposed at a second end thereof, and a stepped segment extending between and connecting the first and second casing segments, wherein the stepped segment extends at an oblique angle from the first and second casing segments.

* * * * *